US006366915B1

(12) United States Patent
Rubert et al.

(10) Patent No.: US 6,366,915 B1
(45) Date of Patent: Apr. 2, 2002

(54) METHOD AND SYSTEM FOR EFFICIENTLY RETRIEVING INFORMATION FROM MULTIPLE DATABASES

(75) Inventors: Amy Rubert; Bren Dykes, both of Boise; Saraswatula V. Sastry, Nampa; Shreedev G. Nair; Shane Hatch, both of Boise, all of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/186,499

(22) Filed: Nov. 4, 1998

(51) Int. Cl.$^7$ .............................................. G06F 17/30
(52) U.S. Cl. .................... 707/10; 707/9; 707/3
(58) Field of Search ................ 707/1–4, 9–10, 707/5

(56) References Cited

U.S. PATENT DOCUMENTS

| | | | | |
|---|---|---|---|---|
| 4,888,690 A | * | 12/1989 | Huber ........................... 707/4 |
| 5,128,860 A | * | 7/1992 | Chapman ...................... 700/99 |
| 5,222,234 A | * | 6/1993 | Wang et al. .................... 707/3 |
| 5,255,181 A | * | 10/1993 | Chapman et al. .............. 705/8 |
| 5,257,366 A | * | 10/1993 | Adair et al. .................... 707/4 |
| 5,421,008 A | * | 5/1995 | Banning et al. ................ 707/4 |
| 5,457,794 A | * | 10/1995 | Azumatani et al. ............ 707/2 |
| 5,550,971 A | * | 8/1996 | Brunner et al. ................ 707/3 |
| 5,584,024 A | * | 12/1996 | Shwartz ......................... 707/4 |
| 5,710,900 A | * | 1/1998 | Anand et al. ................ 345/339 |
| 5,715,443 A | * | 2/1998 | Yanagihara et al. ........... 707/3 |
| 5,721,903 A | * | 2/1998 | Anand et al. ................... 707/5 |
| 5,737,591 A | * | 4/1998 | Kaplan et al. .................. 707/1 |
| 5,764,973 A | * | 6/1998 | Lunceford et al. ............. 707/1 |
| 5,768,581 A | * | 6/1998 | Cochran ..................... 707/104 |
| 5,794,233 A | * | 8/1998 | Rubinstein ...................... 707/4 |
| 5,806,057 A | * | 9/1998 | Gormley et al. ................ 707/1 |
| 5,838,916 A | * | 11/1998 | Domenikos et al. ........ 709/219 |
| 5,845,276 A | * | 12/1998 | Emerson et al. ................ 707/2 |
| 5,873,076 A | * | 2/1999 | Barr et al. ....................... 707/3 |
| 5,956,722 A | * | 9/1999 | Jacobson et al. ............. 707/10 |
| 5,974,406 A | * | 10/1999 | Bisdikian et al. .............. 707/1 |
| 5,978,804 A | * | 11/1999 | Dietzman ..................... 707/10 |
| 5,991,751 A | * | 11/1999 | Rivette et al. .................. 707/1 |
| 5,999,946 A | * | 12/1999 | Bailis et al. ................. 707/201 |
| 6,023,694 A | * | 2/2000 | Kouchi et al. .................. 707/2 |
| 6,085,191 A | * | 7/2000 | Fisher et al. .................... 707/9 |
| 6,094,654 A | * | 7/2000 | Van Huben et al. ............ 707/8 |
| 6,122,741 A | * | 9/2000 | Patterson et al. ........... 713/200 |

\* cited by examiner

*Primary Examiner*—Jean R. Homere
*Assistant Examiner*—Luke S Wassum
(74) *Attorney, Agent, or Firm*—Dorsey & Whitney LLP

(57) ABSTRACT

A system for efficiently retrieving information from one of several databases. The system acts as an intermediary between users and databases, managing user access to the databases so that query specification, query execution, and query result retrieval can occur efficiently and securely. After verifying the identity of a user, the system determines the databases which the user is authorized to access and the database queries which the user is authorized to execute. The system then presents the user with available queries. If the user selects a predefined report form, the system presents the user with previously used options for that report form which the user can select. If the user selects a type of inquiry, the system presents the user with previously used inquiries of the selected type. After the user finishes specifying the query to be executed, the system then allows the user to schedule the query execution. When the scheduled execution time arrives, the system determines whether the selected query can be currently executed, and whether it is actually necessary to execute the query to return accurate query results. If execution is needed to obtain accurate query results and the selected query can be currently executed, the system automatically performs the query execution. After query execution is completed, the system notifies specified users of the query results, and ensures that the query results will be available to the requesting user and to other users.

38 Claims, 11 Drawing Sheets

Report Forms

User: Bob Smith  Group: Payroll

| Description | DB Groups | Database | Parameters | Details |
|---|---|---|---|---|
| Year-To-Date Engineering Payroll | Payroll, Engineering Supervisor | Engineering Payroll DB | Impact | : Low |
| Periodic Engineering Payroll | Payroll, Engineering Supervisor | Engineering Payroll DB | Last Execution | : 05/15/XX 13:05 |
| Year-To-Date Marketing Payroll | Payroll | Marketing Payroll DB | Last User | : DFW |
| . . . | | | Start Date | : 03/01/XX |
| | | | End Date | : 03/31/XX |

UI Screen 100

[Execute Query Now] [Schedule Query Execution] [Display Options] [Notification Options] [Cancel] [DONE]

*Fig. 1*

Inquiries

User: Ally Jones  Group: All (Payroll, Payroll Supervisor)

| Description | DB Groups | Database | |
|---|---|---|---|
| Display Total Engineering Payroll (Regular & Overtime) For Specified Division | Payroll, Engineering Supervisor | Engineering Payroll | GROUP BY: Manager |
| Display Regular Engineering Payroll For Specified Division | Payroll, Engineering Supervisor | Engineering Payroll | GROUP BY: Order Total |
| SELECT sum([Regular Time]) FROM [Engineering Payroll] GROUP BY [Engineer] | Payroll | Engineering Payroll | GROUP BY: Seniority |
| SELECT sum([Regular Time]) FROM [Marketing Payroll] | Payroll Supervisor | Marketing Payroll | Impact:  High |
| . . | | | |

[ Execute Query Now ] [ Schedule Query Execution ] [ Display Options ] [ Notification Options ] [ Cancel ] [ DONE ]

UI Screen 200

*Fig. 2*

METHOD AND SYSTEM FOR EFFICIENTLY RETRIEVING INFORMATION FROM MULTIPLE DATABASES

TECHNICAL FIELD

The present invention relates generally to accessing information stored on a computer, and more particularly to efficiently retrieving information from multiple databases.

BACKGROUND OF THE INVENTION

As companies increasingly create and store large amounts of information in electronic form, computer databases (DBs) play an increasingly important role in everyday business operations. In many situations, a company will have many different databases (e.g., payroll, sales, and manufacturing schedules) with information that needs to be accessible to a variety of individuals throughout the company. At the same time, some information is sensitive (e.g., payroll and cost information), and must be accessible only to those individuals who have been granted authorization to access it. Thus, managing access to database information is an important aspect of business operations.

In a typical company with a computer system that includes multiple computer databases, each computer user will gain access to the computer system (usually a network of computers) using a unique user ID and an individual computer password. Once a user has gained access to the computer system, the user can generally access documents, execute application programs, and utilize computer system resources (e.g., a network printer). In addition, the user may be able to extract information from one or more databases. This will typically be accomplished by executing database queries on a database server for one or more databases.

Database queries can be executed using report forms and inquiries. For any particular database, users or system administrators will generally have created a variety of database report forms that can be used to extract information from that database. Each report form specifies a particular group of information in a database, and when the report form is executed on the database a report is generated containing information extracted from the database. For example, a Year-To-Date Engineering Payroll Report Form may be created for a payroll database, and when executed it will extract the payroll information for people in the engineering group from the beginning of the year until the time of execution. Other report forms include user-definable options, called report parameters, that can adjust the group of information specified by the report. For example, a Periodic Engineering Payroll Report Form may also be created for the payroll database, with the user able to specify start and end date parameters to define a period of time for which corresponding engineering group payroll information will be extracted. In addition to the predefined report forms which a user can execute on a database, most databases will also allow a user to specify a free form inquiry that can be executed on the database. These inquiries will generally be specified using some form of a database query language (e.g., SQL).

Despite the availability of report forms and inquiries, the actual process of extracting desired information from one of several databases can be cumbersome. The user will first need to identify the particular database which contains desired information. In order to execute a query (i.e., a report form or inquiry) on the identified database, the user will then typically need to gain access to the database. For example, the user may need to specify connection information (e.g., the network location of the database server) to be able to communicate with the database. In addition, the user may have a distinct database user ID and database password for each database, and if so the correct database user ID and database password may need to be specified before the user is allowed access to a database.

After the user has succeeded in gaining access to the database, the user must either manually specify a mistake-free inquiry or locate a predefined report form for the database which specifies the appropriate information, allowing execution of the query to retrieve the desired information. If the user attempts to execute a located or specified query which they do not have authorization to execute, execution will not be allowed. There are also situations in which a specific query (i.e., a specific inquiry or a report form with specific parameters) will need to be executed repeatedly (e.g, every morning) or at a non-convenient time (e.g., at 2 a.m.). The need to repeatedly enter or manually execute a specific query can also be cumbersome. As companies grow and have more databases which must be accessed, this process of extracting desired information becomes even more cumbersome.

In addition to the cumbersome aspects of a single user extracting database information, interactions of multiple users can further complicate the process of extracting desired information from databases. As with any computing system, a database server has finite processing power and can be overloaded by too many queries. In particular, high-impact queries can consume significant database server processing power and their execution can be quite time-consuming (e.g., 5 or more minutes). If one user is already executing a high-impact query, another user may be unable to execute another query at the same time. Alternately, database server processing power can be wasted by one user executing a query for which up-to-date results are already available from a previously executed query.

Another complication which can occur involves the storage of information that is extracted from a database in response to a query. Some database servers store all extracted information in the same location, and a database server may store only one copy of results for each report form. Thus, if a first user executes a report form with one set of parameters and another user executes the same report form with a second set of parameters soon afterwards, the results from the second query may overwrite the results from the first query before the first user can access them. Thus, the first user would receive results that were based on different report form parameters, as well as possibly receiving more up-to-date information than was desired. Thus, extracting information from multiple databases in a multi-user environment presents significant difficulties.

SUMMARY OF THE INVENTION

Some embodiments of the present invention provide a method and system for efficiently retrieving information from one of several databases. The system acts as an intermediary between users and the databases, managing user access to the databases so that query specification, query execution, and query result retrieval can occur efficiently. After verifying the identity of a user, the system determines the databases which the user is authorized to access and the database queries which the user is authorized to execute. This can be accomplished for each user, or on the basis of one or more groups to which the user belongs. The system then presents the user with available queries. If the user selects a predefined report form, the system presents the user with previously used parameters for that report form which the user can select. Alternately, the user can specify new report form parameters. If the user selects a type of inquiry, the system presents the user with previously used inquiries of the selected type. When the selected query is to be executed, the system determines whether current execution is possible and whether it is actually necessary to execute the query to return accurate query results. If current report results are already available, the system returns the results without executing the query. If execution is needed to obtain accurate query results and the selected query can be currently executed, the system automatically performs the query execution. If current query execution is needed but not available, the system can alert the user to try again later. After query execution is completed, the system notifies specified users of the query results, and ensures that the query results will be available to the requesting user and to other users.

Thus, the present invention provides various advantages over previous systems. In one embodiment, the system ensures secure access of database information by verifying the identity of a user and allowing the user to execute only authorized queries. In another embodiment, the system minimizes the load on a database server by managing the execution of queries, executing queries only if current query results are not available, and postponing execution of a query while the database server load is too high. In yet another embodiment, the system ensures efficient access to multiple databases by presenting all authorized queries to the user, by presenting the user with previously used report form parameters and inquiries, by automatically performing the query execution, and by notifying users of the query results.

BRIEF DESCRIPTION OF THE DRAWINGS

FIG. 1 is an example user interface screen for specifying a report form to be executed.

FIG. 2 is an example user interface screen for specifying an inquiry to be executed.

DETAILED DESCRIPTION OF THE INVENTION

Figure 3:
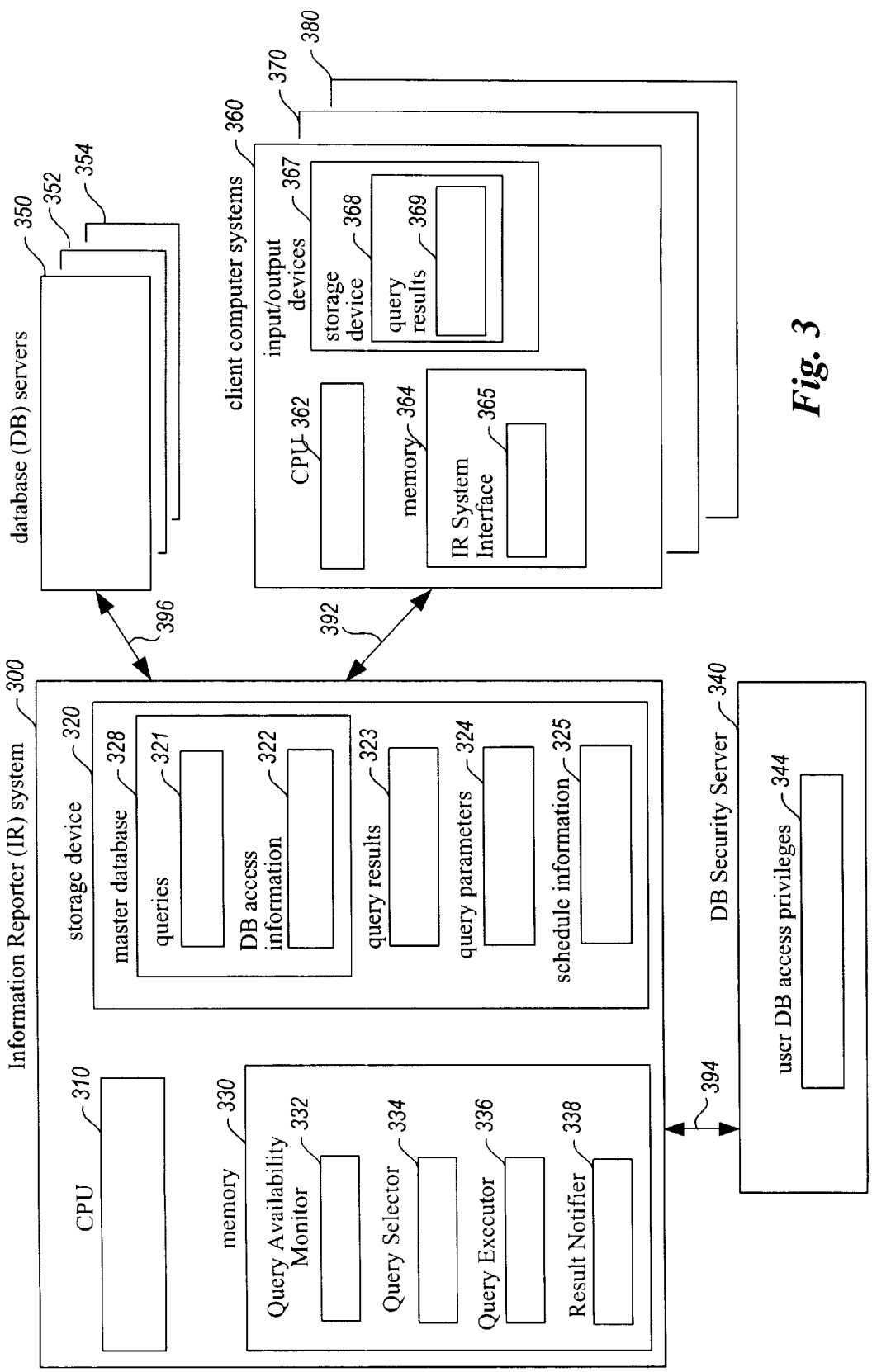
FIG. 3 is a block diagram of an embodiment of the Information Reporter (IR) system of the present invention.

An embodiment of the present invention provides a method and system for a user of a computer system to efficiently access information from one of several databases. In particular, the Information Reporter (IR) system determines the databases that are accessible to a user, determines the types of database queries which the user is authorized to execute, provides an interface with which the user can easily specify a query, schedules the time for query execution, executes the specified query if necessary and appropriate at the scheduled time, and notifies users of the results of the execution.

The IR system begins by verifying the identity of a user accessing the system (e.g., with a user password, cryptographic key, or biometric means). When multiple databases are available, a particular user may be authorized to access only some of the information in some of the databases. Since each of these databases may have a number of predefined report forms with user-modifiable parameters, as well as the capability to execute inquiries specified in a database query language, a user is likely to be authorized for only some report forms and inquiries. Thus, after verifying the user identity, the IR system then determines the databases and the database queries which the user is authorized to access. For example, a software developer may belong to a technical group that is authorized to access technical information and product sales information, but not cost or financial information. Similarly, a particular accounting user may be authorized to access particular product sales and cost information, but not any technical information. The IR system can determine the authorized queries for a user in a variety of ways. For example, a central security server may maintain DB access privilege information for the users, and if so the IR system can retrieve the necessary information from the security server or database security tables. Alternately, in some embodiments the IR system can query individual databases, or require authorization information from the user (e.g., passwords or a cryptographic certificate) to establish the user's access privileges. In addition, authorizations can be based on a combination of individual user privileges as well as group privileges for the defined groups to which the user belongs. Thus, the IR system determines the queries (i.e., predefined report forms and inquiries) that can extract the information for which this user is authorized.

After determining authorized queries, the IR system then presents the user with these queries. If the user selects a report form, the IR system presents the user with likely parameters to be used for the report form (e.g, the parameters previously used by this user, or the most recently used parameters). The user can then select presented parameters or specify different parameters. Similarly, if the user selects a type of inquiry (e.g., all inquiries or Payroll DB inquiries), the IR system presents the user with possible inquiries for that type (e.g., previously used or default inquiries). The IR system can identify previously used parameters and inquiries in a variety of ways, such as by maintaining a separate database of all or of recent queries, or by retrieving such information from the database server on which the query will be executed.

After the user has finished specifying the query, the IR system then executes the query. Before execution begins, the IR system first determines if current results are already available for the selected database query. If current results are available, the IR system returns these results instead of executing the database query. The IR system can determine if current results are available in a variety of ways, such as by maintaining an expiration value for each report form and inquiry and tracking if the most recent applicable results have expired. Alternately, some information in the databases may change only occasionally, and previous queries which accessed that information will be considered current if the database information has not changed.

If there are not current results, the IR system will automatically execute the specified query if query execution will not overload the database server. The IR system can determine database server load in a variety of ways, such as by monitoring whether any high-impact queries are already executing on the database server. If the database server load is sufficiently high so that execution of the specified query would overload the database server, the IR system instead postpones execution, such as by notifying the user to try again later. Once query results are available, either from query execution or from previously executed current results, the IR system notifies interested users of the query results. Interested users can be determined by the IR system in a variety of ways. For example, the user requesting query execution can designate interested users. Alternately, users can designate that they are interested in query results for specified queries if certain conditions are true (e.g., always, the first executed query of the day, or once an hour). Another option if a query is based on group access privileges is for all members of the group to be notified. Notification of results can be accomplished by sending the results to interested users (e.g., via email), or by indicating to the users that the results are available for retrieval.

As an illustrative example of an IR system user interface (UI) for specifying a report form, consider UI screen 100 shown in FIG. 1. In the illustrative example, Bob Smith is a member of the payroll department for a manufacturing organization. Upon entering the IR system, Bob's identity was verified and he indicated that he wished to execute a report form. At that time, UI screen 100 is displayed to Bob. After verifying Bob's identity, the IR system retrieved various user information about Bob's authorization to access various database information. In the example embodiment, authorization privileges are determined by the one or more DB groups to which each member belongs. Thus, in the exemplary embodiment the IR system retrieved Bob's group memberships from a security server holding user authorization information. As is shown in UI screen 100, Bob is a member of the Payroll DB group. A user such as Bob's supervisor may belong to both the Payroll and the Payroll Supervisor DB groups.

Since authorization privileges are determined by membership in DB groups, each report form has one or more associated DB groups. Bob has the authority to execute any report form which is associated with the Payroll DB group. DB groups can be associated with report forms in a variety of ways, such as manually when the report form is created or based on the database which is accessed by the report form. In addition to retrieving Bob's group memberships after his identity was verified, the IR system accessed a master database containing the various report forms and retrieved those report forms associated with the Payroll DB group. These authorized report forms for Bob are shown in UI screen 100 when it is displayed.

When Bob selects a displayed report form, such as Periodic Engineering Payroll, various report form parameters and other information about the report form are displayed in the right-hand column. Report form parameters which are modifiable by Bob are displayed in a normal font, while non-modifiable information is shown in italics. In the exemplary embodiment, Bob can modify the start and end dates for which the report form will retrieve information when it is executed on the database server for the Engineering Payroll DB. The default values for the two parameters can be selected in a variety of ways, such as the last used parameters by any user or the last used parameters by Bob. If Bob is satisfied with the default values, he can select the Execute Query Now button to request immediate query execution. Alternately, Bob can select one or both parameter values for manual modification before requesting query execution. In an alternate embodiment, a list of possible values may be displayed for each parameter either as the default view or upon a user indication for the values.

Before executing of the query, the IR system retrieves information from the master database about accessing the database server for the Engineering Payroll DB. This information could include a user ID and password to enable access to the database server, as well as a network location for the Engineering Payroll DB to facilitate contacting the database. In addition, before query execution Bob can also specify options for the type of notification regarding the results of the report form execution as well as for the display of the results. For example, Bob could select the Display Options button to specify whether results should be returned in a format appropriate for an application program such as Bob's spreadsheet or word processing program. Similarly, Bob could select the Notification Options button to specify whether results should be stored on a local drive, stored on a network drive, or sent to Bob via email. In addition, Bob could indicate that all Payroll DB group members be notified when the results are available.

If Bob prefers scheduling the execution of a report form for a later time rather than immediately executing it, he can select the Schedule Query Execution button. Bob can then indicate when the specified report form should be executed, as well as factors such as whether the report form execution should occur on a recurring basis and at what priority level the execution should occur (e.g., high priority). In the case of overloading of the database server for the Engineering Payroll DB, query priority can be used to determine the order of query execution. In some embodiments, users may only be able to request that scheduling takes place, with the system or manual approval required to fulfill the request. Similarly, some embodiments may allow inquiries to be scheduled for execution as well as report forms.

When query execution is to take place, whether it was immediate or at a later scheduled time, the IR system will determine whether query execution is both necessary and appropriate. The IR system will first check if appropriate query execution results are already available. For example, if the previous execution of this report form on 05/15/XX used these same report form parameters and the information in the Engineering Payroll DB corresponding to those dates has not changed, then the previous execution results are sufficiently current and accurate. Alternately, if data in the Engineering Payroll DB changes only very gradually and exact results are not required, any results which are less than two days old may be considered to be sufficiently accurate. If appropriate query execution results are available, Bob will be notified in the manner specified by the notification options.

If appropriate query execution results are not available, the IR system then determines whether the report form can be executed at the current time without overloading the database server for the Engineering Payroll DB. This can be determined in a variety of ways. For example, since the report form is low impact, its execution may be allowed at any time. Alternately, the IR system could contact the database server to determine its current load, or could maintain a list of the currently executing queries on that database server and use the list to determine the current load on the database server. If the report form can be executed, the database server is notified to execute the specified query, and the IR system notifies the appropriate users in the appropriate manner when the query results are available.

UI screen 200 shown in FIG. 2 similarly provides an illustrative example of an IR system user interface (UI) for specifying an inquiry. In the illustrative example, some inquiries are displayed using high-level descriptive names, while other inquiries are displayed using a database query language. In other embodiments, the underlying database query language statements are not displayed to the users. In such embodiments, users may not be able to manually specify new inquiries using a query language, instead being able to execute and receive results for only pre-defined queries.

In the illustrative example, Ally Jones indicated that she wished to execute an inquiry, prompting the display of UI screen 200. In the exemplary embodiment, inquiries can have one or more associated DB groups in the same manner as report forms. DB groups can be associated with inquiries in a variety of ways. For example, every inquiry that is manually specified could require an associated DB group and could be stored for later re-use. Alternately, frequently used inquiries could be predefined in the same manner as report forms. Since Ally is Bob's supervisor, she belongs to DB groups Payroll and Payroll Supervisor. Thus, in addition to retrieving Ally's group memberships after her identity was verified, the IR system accessed the master database containing the various inquiries and retrieved those inquiries associated with the Payroll and Payroll Supervisor DB groups.

Since Ally belongs to multiple DB groups, she can specify that all available inquiries be displayed or only those associated with a particular DB group. UI screen 200 has defaulted to displaying all available inquiries. When Ally selects a displayed inquiry, such as the fourth displayed inquiry, various inquiry parameters and other information are displayed in the right-hand column. For this inquiry, several possible parameters are available for the GROUP BY clause of the inquiry. These parameters can be determined in a variety of ways, such as previously used parameters, predefined parameters, or any possible parameters based on the database columns. After Ally selects a parameter, the specified query is ready for execution. Alternately, Ally could be allowed to manually type in an entirely new inquiry or a new parameter for the selected inquiry.

Before executing of the query, the IR system retrieves information from the master database about accessing the database server for the Marketing Payroll DB. Ally could also specify options for the type of notification regarding the results of the inquiry execution as well as for the display of the results. In addition, Ally could schedule the execution of the query for a later time if she desires. When query execution is to take place, whether it was immediate or at a later scheduled time, the IR system will again determine whether query execution is both necessary and appropriate. Since this inquiry is a high impact query that will require significant processing resources from the database server for the Marketing Payroll DB and that may require a long time for execution, execution of the query may not be appropriate. In the exemplary embodiment, only one high impact query of each type can execute on a database server at a time. Thus, if another high impact query of the same type is already executing on the database server, execution of the specified query will be delayed until the other high impact query is no longer executing. After the inquiry is executed, the IR system notifies the appropriate users in the appropriate manner. This can include displaying the results to Ally immediately on a UI screen, as well as other methods of storing the results in a file for later access.

Those skilled in the art will appreciate that the exemplary UI screens are for illustrative purposes only. Various other methods exist for presenting available queries to users, as well as for allowing users to manually specify queries and query parameters. For example, queries could be grouped based on the databases from which they access information rather than by DB groups, and inquiries could be automatically constructed in response to natural language or other high-level information specification.

FIG. 3 illustrates an embodiment of an IR system 300, database servers 350, 352, and 354, a DB Security Server 340, client computer systems 360, 370, and 380, and communications links 392, 394, and 396. The database servers provide the IR system access to various databases (not shown). Client computer system 360 includes a CPU 362, a memory 364, and input/output (I/O) devices 367 including a storage device 368. Client computers systems 370 and 380 contain similar components to client computer system 360 and perform similar functionality for the users of those computer systems, and thus are not illustrated in detail for the sake of brevity. An IR System Interface 365 that is executing in memory communicates both with the user of the client computer system and with the IR system, assisting the user to retrieve database information by using the IR system.

Before the user of the client computer system is allowed to access information in a database, the IR System Interface first determines and verifies the identity of the user. For example, if the user was required to enter a user name and a user password to gain access to the client computer system 360, this verification may be sufficient. In environments where additional security is required, the IR System Interface could require that an additional password be entered by the user, or could use biometric analysis (e.g., a retinal scan or face recognition) to verify the identity of the user. After user identity is verified, the IR System Interface notifies the IR system of the verified user identify and that the user wishes to access database information.

The IR system includes a CPU 310, a memory 330, and a storage device 320. When the IR system is notified of a user's desire to access database information, a Query Availability Monitor 332 executing in memory receives this information. The Query Availability Monitor then accesses the DB Security Server to determine the database access privileges of the user. The DB Security Server stores user DB access privileges 344, which can be represented in a variety of ways. For example, each user may belong to one or more DB groups, with each such DB group having authorization to access a number of predefined database queries. If so, the DB Security Server would return the DB groups for the user. Alternately, each user could have an individual entry in the user DB access privileges 344 that indicates types of database information, specific databases, or specific predefined queries which that individual user can access. If so, the DB Security Server would return the entry for the user. Those skilled in the art will appreciate that access information for a user can be specified in a variety of ways.

After receiving access privilege information for the user, the Query Availability Monitor then accesses a master database 328 located on storage device 320. The master database includes information used to access the various database servers, including predefined queries 321 and DB access information 322. The DB access information may include an identification of the database that is associated with each of the predefined queries, as well as information on how to access information in that database (e.g., network address of the database server for that database, database user name, and database password). The Query Availability Monitor retrieves the predefined queries which correspond to the user's access privileges. For example, DB groups to which the user belongs can indicate databases for which the user can execute any query, or only specific queries which the user can execute. After determining the queries for which the user is authorized, the Query Availability Monitor notifies the Query Selector 334 executing in memory of these authorized database queries.

The Query Selector receives the information about authorized database queries, determines a particular report form or inquiry to be executed, and obtains scheduling and notification information. The Query Selector first communicates the available predefined report forms and inquiries to the IR System Interface on the client computer system being used by the verified user. The IR System Interface on that client computer system then presents these available report forms and inquiries to the user via a graphical user interface. As described previously, these queries can be presented to the user in a variety of ways. In addition, if the user is authorized to enter free-form inquiries on one or more databases (e.g., based on the user's access privileges), the IR System Interface receives this information and allows the user to enter such an inquiry in an appropriate format (e.g., SQL or a natural language specification). After the user has either selected or entered a specific report form or inquiry, the IR System Interface notifies the Query Selector of the user's selection.

If the selected database query includes user-definable parameters, the Query Selector will then supply the user with suggestions for the parameters. For example, the Query Selector can access the stored query parameters 324 from storage device 320, which contain previously used and default parameters for the selected query. In one embodiment, only the most recently used parameters for the selected query may be stored, regardless of the user that specified the parameters. Alternately, the most recently used parameters may be stored for each user, or all previously used parameters for this user may be stored. Those skilled in the art will appreciate that possible query parameters can be generated in a variety of ways other than retrieving previously used parameters for the specified query. For example, query parameters from other recently specified queries by the user could be retrieved and adapted for the current query, or an intelligent software agent for the user could attempt to anticipate the parameters which the user will desire based on context and user-specific information.

After obtaining one or more possible query parameters, the Query Selector notifies the IR System Interface of these parameters. The IR System Interface then presents the selected query to the user with the retrieved parameters as possible suggestions. The user can then select a presented parameters or specify different parameters. After the user has specified the parameters for the query, the IR System Interface notifies the IR system of the completed query. The Query Selector can then update the stored query parameters to reflect these recently used parameters by this user.

In addition to assisting the user in selecting a database query to be executed, the Query Selector also collects information to facilitate the query execution. For example, the Query Selector allows immediate query execution, or the scheduling of query execution for a later time. If the execution of the query is to be scheduled for a later time, the Query Selector obtains the necessary scheduling information from the user via the IR System Interface. The Query Selector also collects information about the intended recipients of the query execution results. In one embodiment, a list of users who will be notified of the results of the query execution when available can be specified by the user selecting a query. Alternately, the Query Selector can obtain information about result recipients in a variety of other ways. For example, users can specify queries for which they desire notification about results of execution (e.g., any query by User X, or report form Y when executed about any user in DB group), and the Query Selector can store such information and use it to determine a notification list. Another possibility is for the Query Selector to determine one or more DB groups to which the selected query corresponds, and to notify all users in those groups of the execution results. After the Query Selector has obtained the necessary information about the query to be executed and the users to be notified of query execution results, the Query Selector schedules execution of the query. This query execution schedule information is stored with the schedule information 325 on storage device 320.

When the query execution schedule information indicates that a query is to be executed, the Query Executor 336 executing in memory retrieves and executes the query. The Query Executor first retrieves the DB access information on the master database to determine how to execute the query. The Query Executor then uses this information to log on to the appropriate database and execute the selected query with the selected parameters. Those skilled in the art will appreciate that execution of queries can be performed in a variety of manners that are well known in the art.

In one embodiment, before executing a query the Query Executor first determines if it is necessary to execute the query to obtain current query execution results. For example, some databases have slow-change information which changes only rarely, or only at specified times (e.g., at midnight each day). If the selected query has already been executed after the time that the data could have changed and the results from the earlier execution are available, then it is not necessary to re-execute the selected query to retrieve the same results. Alternately, if the information in the database changes only gradually (e.g., current temperature), recent information that has been extracted from the database may be sufficiently current so that query execution is not necessary. In either situation, the Query Executor can return the current results from the earlier query as the query execution results. This query execution result substitution can occur automatically without notifying the user, or can be suggested to the user and performed only if confirmation is obtained. In the automatic mode, query execution will thus occur only when necessary to obtain sufficiently current information.

Even if query execution is necessary, the Query Executor must determine if the database server for the database associated with the query has sufficient processing power to perform the query execution at the current time. Some types of queries, referred to as high-impact queries, require significant processing by the database server in order to execute the query. Thus, only a limited number of high-impact queries may be allowed to be executed at a single time. In one embodiment, the determination of whether the database server has sufficient processing power is made by restricting the number of high impact queries (e.g., only one) which can execute simultaneously. If the database server cannot execute the query at the current time, the Query Executor can delay the execution of the query. For example, the Query Executor could automatically execute the query at a later time when the database server can execute the query, or the Query Executor can contact the user in order to schedule query execution for a later time. If the query is instead a low-impact query that can be executed quickly and with little cost in database server processing power, the Query Executor can execute the query without first determining the status of the database server.

After the query is executed, the results of the query execution are typically stored in the query results 323 on the storage device 320. In addition to the extracted database information, other information (e.g, the time of execution and the requesting user) can also be stored. The results can be stored in a variety of formats, such as a spreadsheet file (e.g., Microsoft Excel), a portable document format (e.g., PDF), or as a bit image which can only be viewed and printed. The query execution results can also be forwarded by the Query Executor to the client computer system, where the results can be stored on a local storage device (e.g., query results 369 on storage device 368). In some situations it is desirable that the query execution results not be stored on the IR system. For example, if the IR system maintains only one set of results for a particular report form and multiple users execute that report form, it may be possible for one user's results to overwrite the results of another user before the first user can retrieve their results. Moreover, if different parameters are used to generate the two results, the first user may see results that correspond to a different query than expected when they access the query results on the IR system. Thus, if necessary the Query Executor can forward the query execution results to the IR System Interface on the client computer system without storing the results in the query results 323. If the query execution results are stored locally, the IR System Interface accesses those locally stored results when they are requested by the user.

If users other than the requesting user are interested in the results from the execution of the selected query, the Result Notifier 338 executing in memory can notify those users of the results when the query execution is complete. As discussed previously, the user requesting the query execution can specify the group of result recipients when selecting the query or after execution results are available, or the Result Notifier can determine an appropriate group of recipients based on the selected query (e.g., all members of the requesting user's DB group). Alternately, the user requesting the query execution can manually notify a selected group of result recipients rather than use the Result Notifier. Those skilled in the art will appreciate that after the selected query is executed (or if current results were already available), the Result Notifier can notify the result recipients in a variety of ways. For example, the Result Notifier can construct an email message to the recipients with an appropriate subject and descriptive text, and can include a link to the query execution result files. This will enable each receiver of the email to select the link and automatically display the results. In addition, such a receiver of the email can typically store a copy of the results on their local computer for modification or for later access. Rather than including a link to results files, the Result Notifier could instead include the results as part of the email message, or could merely disclose a location of the results or a method for the email recipient to access the results.

Those skilled in the art will appreciate that client computer systems 360, 370, and 380, IR system 300, DB Security Server 340, and database servers 350, 352, and 354 are merely illustrative. Thus, these systems may contain additional components or may lack some illustrated components. In addition, the functionality of the various subcomponents of the system may be combined in different combinations. For example, in one embodiment the IR system 300 and the DB security server 340 may be combined into a single computer system. Alternately, the components executing in memory 330 of the IR system could be part of the IR System Interface that executes on each client computer system. As will be evident to those skilled in the art, other such combinations are also possible. Accordingly, the present invention may be practiced with other computer system configurations.

Figure 4:
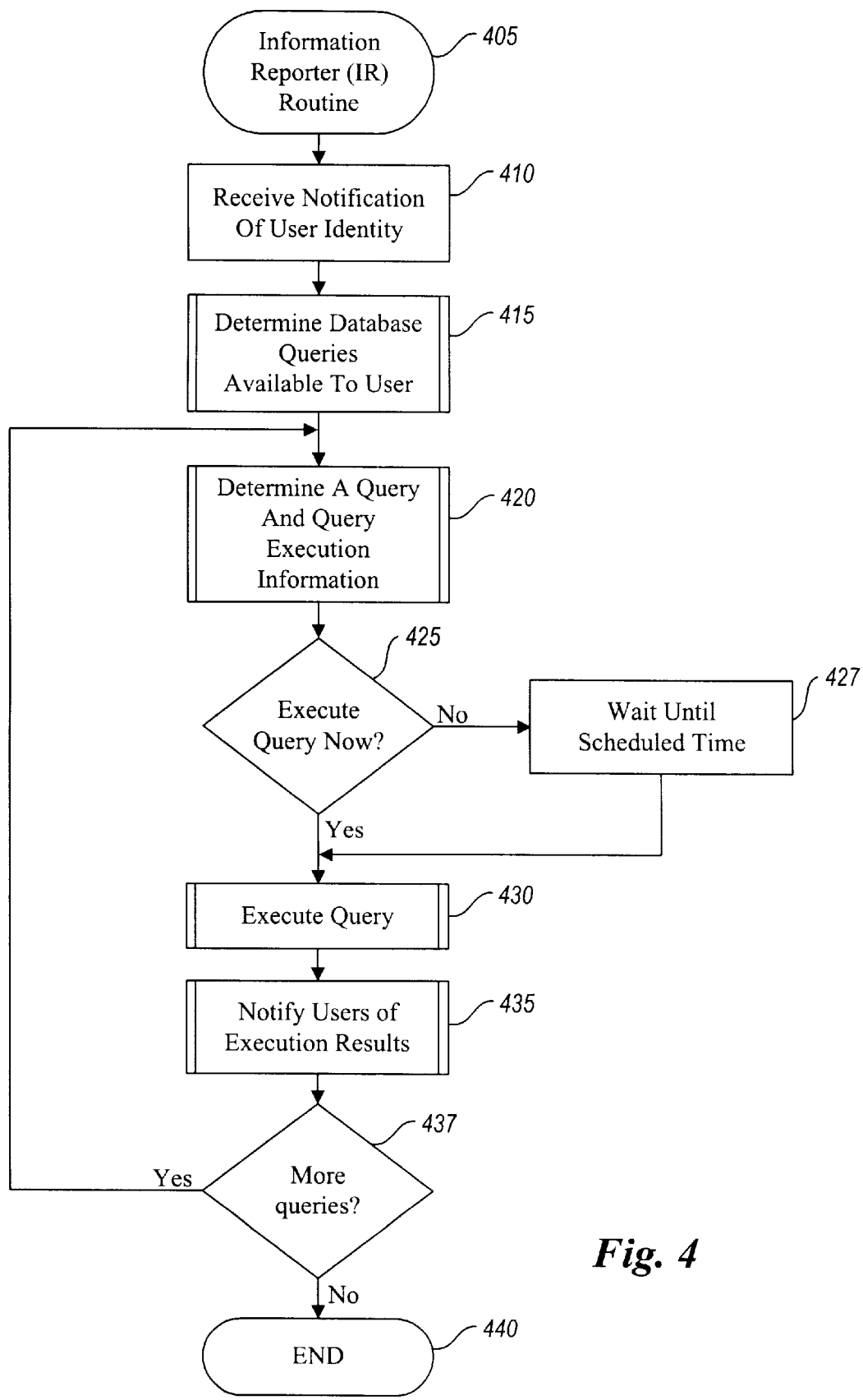
FIG. 4 is a flow diagram of a possible implementation of the Information Reporter routine.

FIG. 4 is a flow diagram of a possible implementation of the Information Reporter system routine 405. The IR routine will receive notification of a user identity, determine databases and database queries which the user is authorized to access or execute, determine a particular query to be executed at a scheduled time, determine a group of recipient users to be notified of the results of the execution, execute the selected query at the scheduled time, and notify the recipient users of the query execution results. The IR routine begins at step 410, where the routine receives a notification of user identity. If security is a concern, this notification can include verification of the identity of the user (e.g., using biometric analysis or key encryption). If security is less of a concern, a specification of a user name and a password may provide sufficient security. Those skilled in the art will appreciate that there are many ways to verify the identity of a user. After determining the user identity, the routine then continues to step 415 to determine the database queries which the user is authorized to execute by invoking the Determine Database Queries Available To User subroutine. In step 420, the routine determines a specific query (i.e., a predefined report form or inquiry with user-specified parameters) to be executed by performing the Determine A Query And Query Execution Information subroutine. This subroutine also determines scheduling and results notification information for the query to be executed. The routine continues to step 425, where it determines whether the query is to be scheduled for immediate execution. If so, the routine continues to step 430 to execute the query by performing the Execute Query subroutine. If it is determined in step 425 that the query is not scheduled for immediate execution, the routine instead continues to step 427 to wait until the query is scheduled for execution. When the scheduled time arrives, the routine continues to step 430 to execute the query. After performing step 430, the routine continues to step 435 to notify the appropriate users of the results of the query execution by performing the Notify Users Of Execution Results subroutine. The routine then continues to step 437 to determine if there are more queries to be executed for this user. If so, the routine returns to step 420, and if not the routine ends at step 440.

Those skilled in the art will appreciate that the IR routine can be implemented in a variety of different ways. For example, the IR routine could be designed to schedule multiple queries before executing a series of scheduled queries. While the routine is shown as a single flow of control, the routine could also be performed by multiple computers working in conjunction (e.g., an IR system and an IR System Interface on a client computer system) or by a single computer. Moreover, multiple instances of the IR routine and subroutines can be executing at the same time. Those skilled in the art will appreciate that these and other modifications can be made within the spirit of the invention as described herein.

Figure 5:
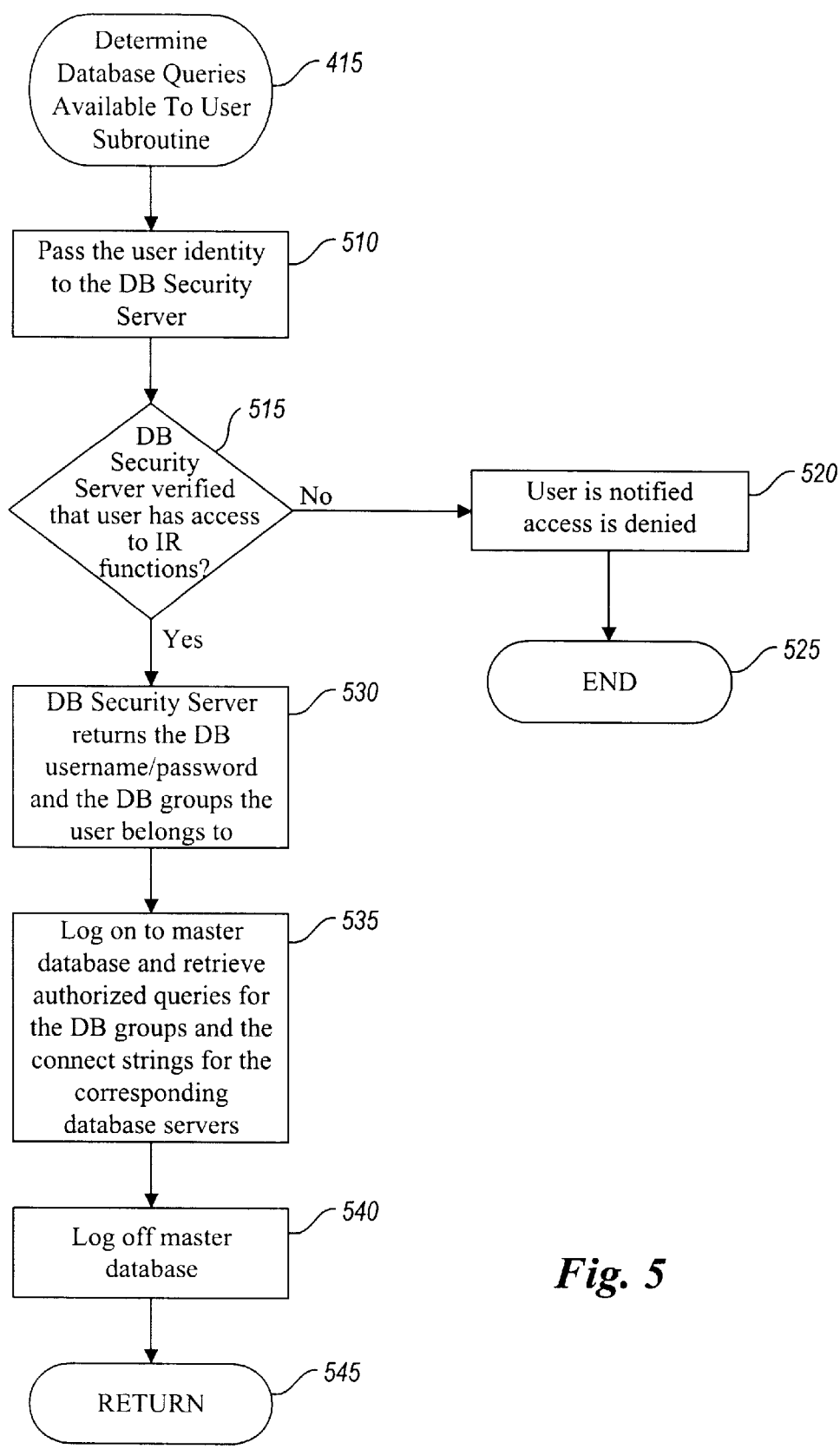
FIG. 5 is a flow diagram of a possible implementation of the Determine Database Queries Available To User subroutine.

FIG. 5 is a flow diagram of a possible implementation of the Determine Database Queries Available To User subroutine 415. The subroutine verifies the identity of the user executing the subroutine, determines if the user is authorized to access the IR routine, and if so, determines the queries which the user is authorized to execute. The subroutine begins at step 510, where it passes the verified user identity to a DB Security Server. In the illustrated embodiment, the DB Security Server maintains a list of one or more DB groups for each user (e.g., payroll or engineering). These DB groups indicate the types of information which members of the group are authorized to access. In step 515, the DB Security Server verifies whether the user has access to IR system functionality by determining if the user is a member of any DB groups with authority to access database information. If not, the subroutine continues to step 520 where the user is notified that access is denied, and the subroutine and routine then end in step 525.

If the user is instead verified to have access to the IR system in step 515, the subroutine continues to step 530 where the DB Security Server returns a master database user name and password for the user, as well as the DB groups to which the user belongs. The master database contains information about the queries authorized for the various DB groups, as well as the necessary information to execute those queries. In step 535, the subroutine logs on to the master database using the user name and password, and retrieves report forms and inquiries that correspond to the DB groups for the user. In addition, the subroutine can retrieve database access information for the retrieved queries, such as connect strings to be used to contact the database servers corresponding to the retrieved queries. In step 540, the subroutine logs off the master database, and in step 545 the subroutine returns.

Those skilled in the art will appreciate that a variety of variations can be used when determining database queries available to a user. For example, the DB Security Server and master database could be a single entity which both verifies that a user has access to the IR system functionality and that returns available queries. In addition, lists of authorized queries could be maintained for each user individually rather than tracking DB groups. Alternately, each user could be authorized to access one or more types of database information, and each database server could be analyzed to determine appropriate report forms and inquiries for their databases which correspond to the user's authorized types of database information.

Figure 6A:
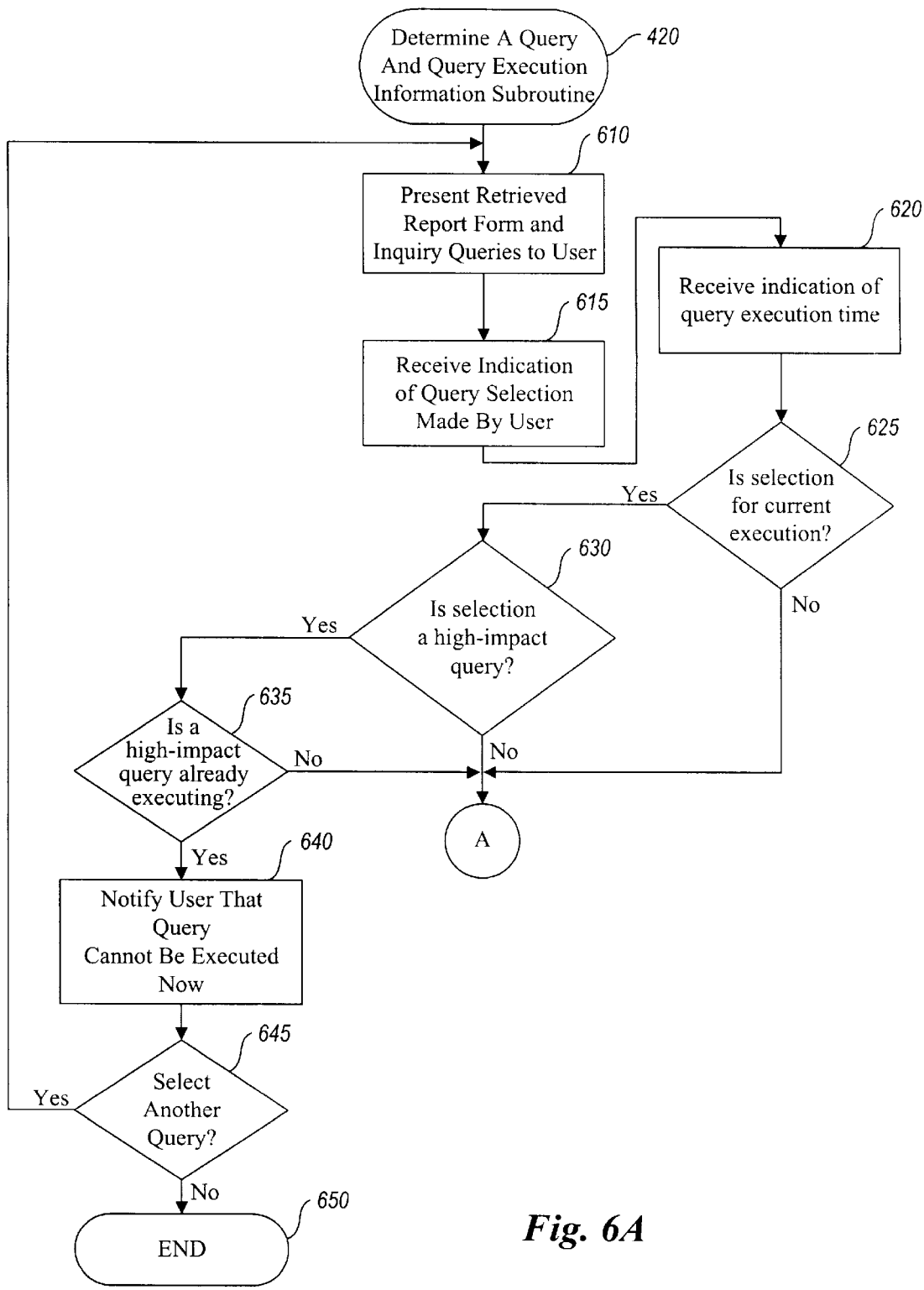
FIGS. 6A and 6B are flow diagrams of a possible implementation of the Determine A Query And Query Execution Information subroutine.
Figure 6B:
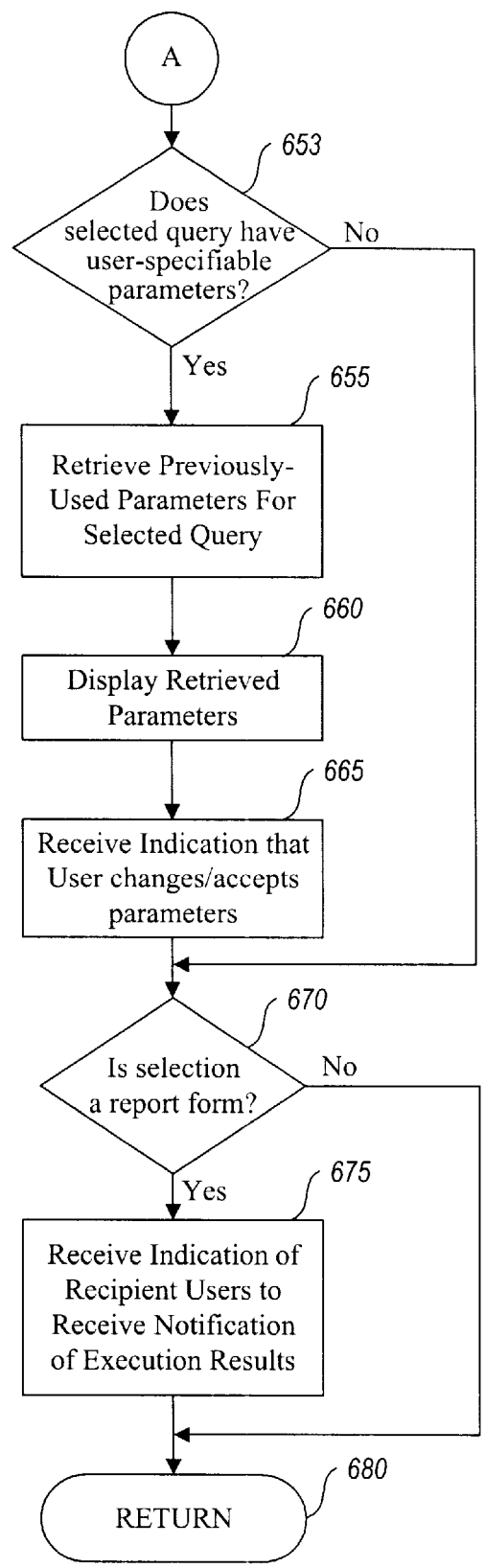

FIGS. 6A and 6B are flow diagrams of a possible implementation of the Determine A Query And Query Execution Information subroutine 420. The subroutine presents the user with authorized report forms and inquiries, allows the user to select a query and schedule it for execution, determines user-specified parameters for the selected report form or inquiry and determines if the query can be executed immediately. The subroutine begins in step 610 where it receives and presents to the user the report forms and inquiries which were determined to be authorized for the user. These queries can be forwarded to this subroutine from the Determine Database Queries Available To User subroutine 415 (shown in FIG. 5), or they could temporarily be stored on and then retrieved from the IR system. In step 615 the subroutine then receives an indication of a query selected by the user. Typically, the user will select a query that is presented. However, if the user is authorized to enter freeform inquiries on one or more databases, the user can enter such an inquiry in an appropriate format (e.g., SQL) instead of selecting a predefined query. The subroutine then prompts the user to schedule a time of execution for the query, and in step 620 the subroutine receives the scheduling information.

In step 625, the subroutine determines if the selected query is to be executed immediately. If so, the subroutine will first determine if the selected query is able to be currently executed before prompting the user to select parameters for the query. In the illustrated embodiment, only a single high-impact query can be executed at a time on a particular database server. Thus, the subroutine first proceeds to step 630 to determine if the selected query is a high-impact query. High-impact queries can be identified in a variety of ways, such as from empirical timing of previously executed queries or by analyzing the types of database information to be extracted in relation to the current configuration of the associated database (e.g., current indices defined on the database). Moreover, information about the query's impact can be received for all queries in step 610, or the subroutine could retrieve this information after a query is selected.

If the selected query is determined to be a high-impact query in step 630, the subroutine continues to step 635 to determine if a high-impact query is already executing on the database server corresponding to the selected query. If so, the subroutine continues to step 640 to notify the user that the currently selected query cannot be executed at the current time. The subroutine then continues to step 645 to determine whether the user wishes to select another query or to select the same query at a later execution time. If not, the subroutine and routine end at step 650, and if so the subroutine returns to step 610.

If the subroutine can continue with the further specification of the query to be executed (i.e., either the selected query is not for current execution, the selected query is not a high-impact query, or there is not a currently executing high-impact query on the database server corresponding to the selected query), the subroutine continues to step 653 to determine if the selected query has user-specifiable parameters. While predefined report forms typically have parameters which can be specified by a user executing the report form, inquiries will typically not have such parameters. Nonetheless, some types of inquiries can have such parameters, such as multiple inquiries that have been grouped together in such a manner that a user-specified parameter will select a particular inquiry from the group (e.g., 12 individual user-defined inquiries to extract a particular type of information from a specified database, with each inquiry for a specific month, and with the user-specifiable parameter being the month for which information will be extracted).

If it is determined that the selected query has user-specifiable parameters, the subroutine continues to step 655 to retrieve previously used parameters for the selected query. In the illustrated embodiment, the subroutine retrieves the most-recently used parameters for the selected query and uses those parameters as default values. Alternately, multiple groups of previously used parameters could be retrieved and presented to the user for selection. After retrieving the most-recently used parameters, the subroutine continues to step 660 where the selected query is presented to the user with the retrieved parameters included as defaults. The user can then accept the default parameters or specify different parameters. In step 665, the subroutine receives an indication that the user has selected parameters by either accepting the defaults or specifying new parameters.

After the user selects the query parameters, or if it was determined in step 653 that the selected query did not have such parameters, the subroutine continues to step 670 to determine if the selected query is a report form. In the illustrated embodiment, only the user requesting execution of an inquiry is notified of the results, while multiple users may be notified of the results from executing a report form. Thus, if it is determined in step 670 that the selected query is a report form, the subroutine continues to step 675 to determine the users to be notified of the results of the report form execution. In the illustrated embodiment, the requesting user specifies the users to receive the notification. Thus, the subroutine prompts the requesting user to designate the users to be notified, and in step 675 receives the information from the requesting user. After specifying the users to be notified, or if it was determined in step 670 that the selected query is not a report form, the subroutine continues to step 680 where it returns.

Figure 7:
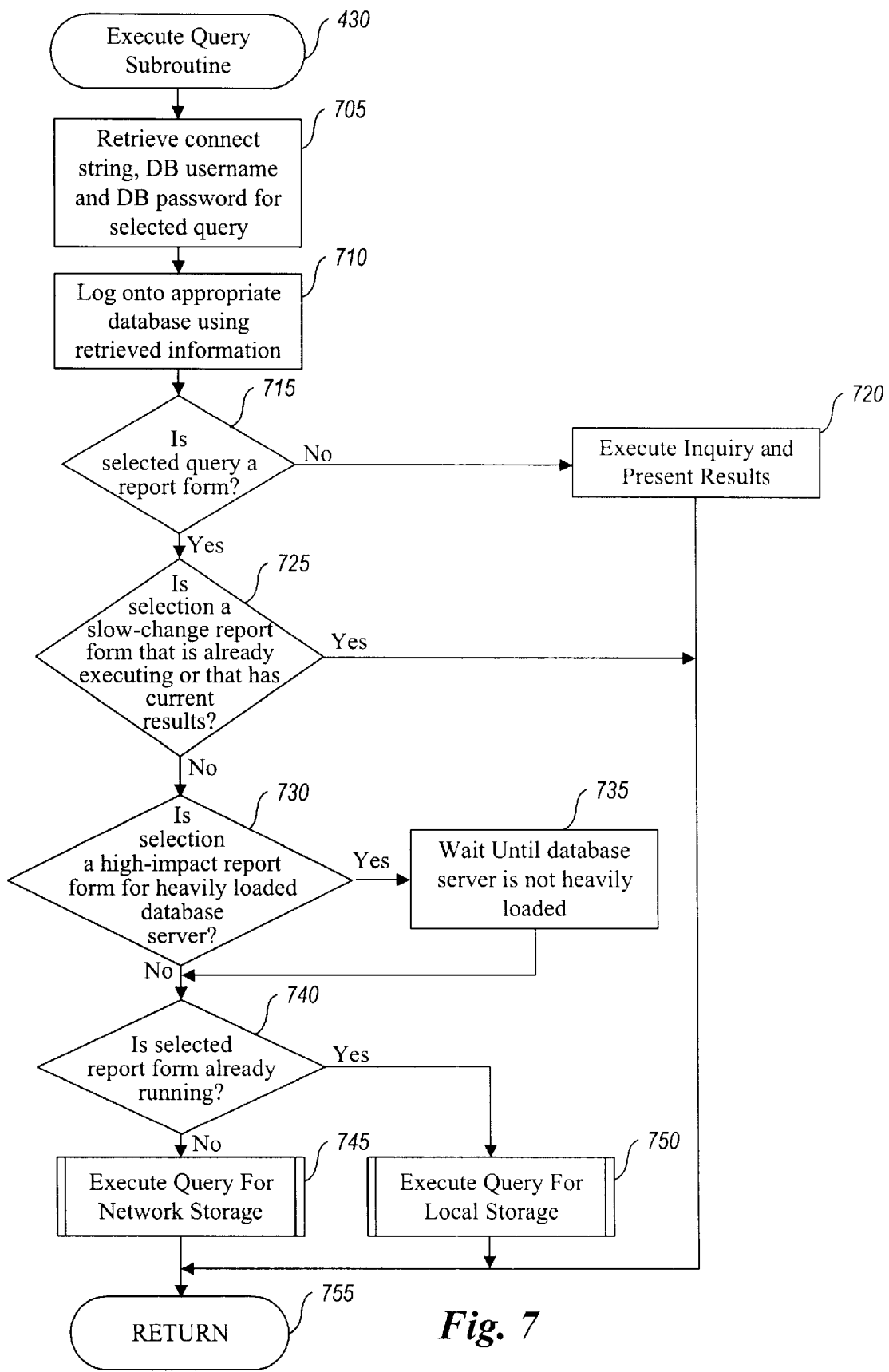
FIG. 7 is a flow diagram of a possible implementation of the Execute Determined Query subroutine.

FIG. 7 is a flow diagram of a possible implementation of the Execute Query subroutine 430. The subroutine executes a selected query at its scheduled time by logging on to the appropriate database server, executing the report form or inquiry, and storing the query execution results to a local disk drive of the requesting user and/or to a network-accessible disk drive. The subroutine begins at step 705 where it retrieves the information needed to execute the query on the database server corresponding to the query, such as a DB user name and password for the requesting user and a connect string to locate the database server. In the illustrated embodiment, this query execution information was extracted from the master database by subroutine 415. Thus, this information can be forwarded along with the query information as that information moves throughout the various subroutines, or the current subroutine can retrieve the information from temporary storage on the IR system. In an alternate embodiment, the Execute Query subroutine could extract this information directly from the master database. After retrieving the query execution information, the subroutine continues to step 710 where it uses the retrieved query execution information to log on to the database server corresponding to the query to be executed. The subroutine then continues to step 715, where it determines if the selected query is a report form. If not, the subroutine continues to step 720 to execute the inquiry, and present the results to the requesting user. In the illustrated embodiment, results of inquiry executions are returned directly to the requesting user rather than being stored in a file of a local or network disk drive.

If it was instead determined in step 715 that the selection is a report form, the subroutine continues to step 725 to determine if the selected report form is a slow-change report form that is already executing. Since slow-change report forms extract database information that remains up-to-date for a period of time, it is not necessary to execute the selected query if current results are already available or will be available when an already-executing report form has finished. Thus, if it is determined in step 725 that the selected report form is such a slow-change report form, the subroutine proceeds to step 755 and returns. If the selected report form is not such a slow-change report form, however, the subroutine instead continues to step 730 to determine if the selected report form is a high-impact report form for a database server that already has a high load. In the illustrated embodiment, a database server can only execute one high-impact report form at a time, so if a database server is currently executing such a report form then it already has a sufficiently high load that would prevent it from executing another high-impact report form. Alternately, multiple non-high-impact report forms and inquiries that are executing on a database server could combine to create a high load on a database server that would prevent the database server from executing a high-impact report form. If it was determined in step 730 that the selected report form is a high-impact report form and its corresponding database server has a high load, the subroutine continues to step 735 where it postpones execution of the selected report form until the database server does not have a high load that prevents execution of the selected report form.

After step 735, or if it was not determined in step 730 that the selected report form was a high-impact report form and that its corresponding database server had a high load, the subroutine continues to step 740 to determine if another instance of this report form is already executing on the database server. In the illustrated embodiment, the default mode of operation is to save report form execution results on a network-accessible disk drive as well as on the local disk drive of the requesting user. However, the illustrated embodiment stores only one set of results for each report form. Thus, storing the query execution results for a report form on the network-accessible drive has the effect of overwriting the previously saved query execution results for that report form. It is therefore undesirable for multiple copies of the same report form to be executed simultaneously (e.g., with different parameters by different requesting users) or in rapid succession, thus enabling a copy of query results stored on the network-accessible drive to remain unchanged for a period of time sufficient to allow the IR system to disseminate the results to users who are to be notified.

Those skilled in the art will appreciate that various mechanisms can be implemented to address this situation, such as storing query results from every query execution in a unique location on a network-accessible drive, storing query results only on local drives of requesting users, or preventing multiple copies of the same report form from executing simultaneously. The latter technique is employed in the exemplary embodiment. Therefore, if it is determined in step 740 that another copy of this report form is not already executing on the database server, the subroutine continues to step 745 to execute the Execute Query For Network Storage subroutine. Results of the execution will be stored on both the local disk drive of the requesting user and on a network-accessible disk drive. If it was instead determined in step 740 that another copy of this report form is already executing on the database server, the subroutine continues to step 750 to execute the Execute Query For Local Storage subroutine. Results of this execution will be stored only on the local disk drive of the requesting user. After steps 745 or 750, the subroutine continues to step 755 and returns.

Figure 8:
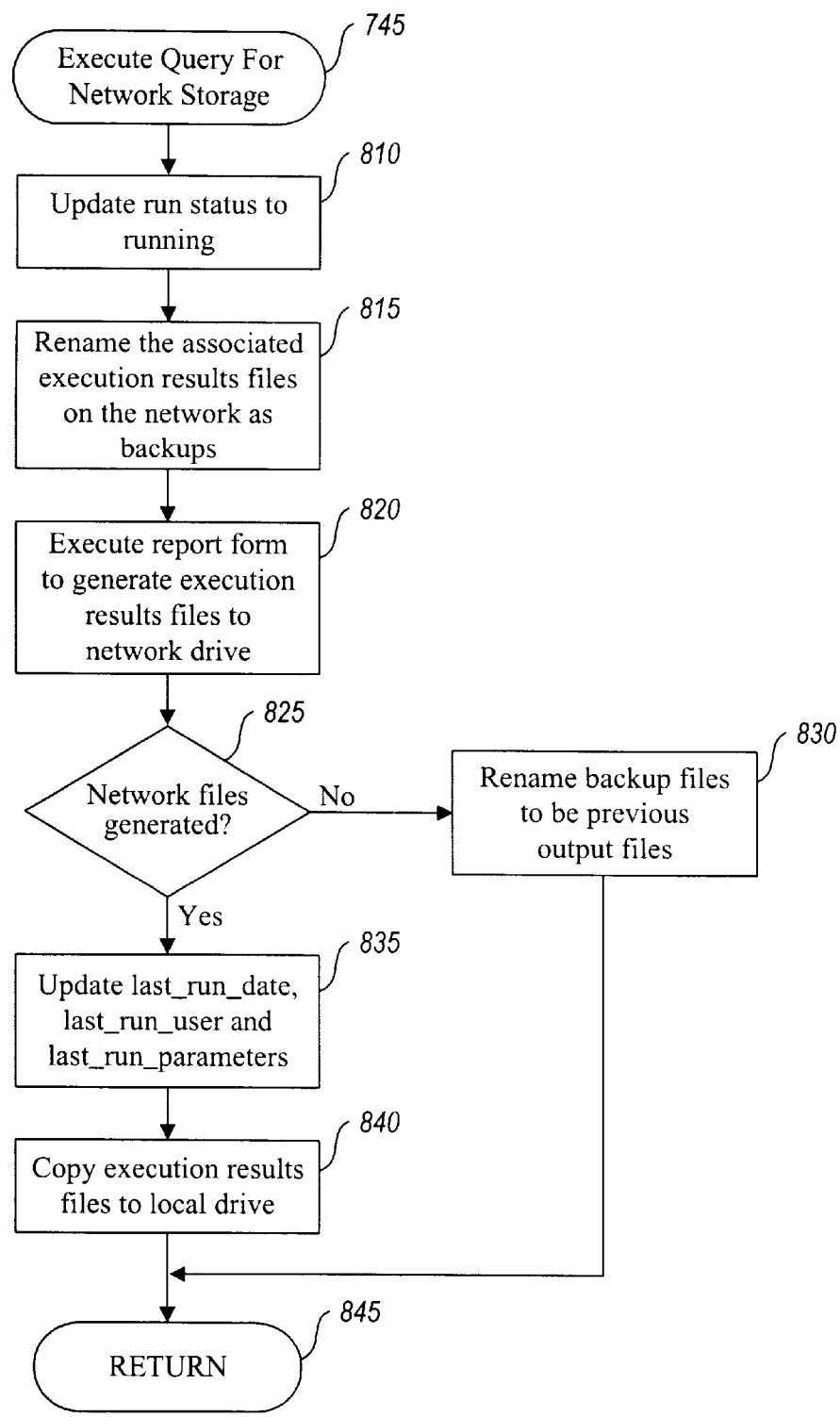
FIG. 8 is a flow diagram of a possible implementation of the Execute Query For Network Storage subroutine.

FIG. 8 is a flow diagram of a possible implementation of the Execute Query For Network Storage subroutine 745. The subroutine executes the report form and stores results of the execution on both the local disk drive of the requesting user and on a network-accessible disk drive. The subroutine begins in step 810 where information about the execution of this report form is updated to reflect that the report form is being executed now. Those skilled in the art will appreciate that information related to the execution of a query can be stored and accessed in a variety of manners, such as in the master database along with other information about the corresponding query or with the database server on which the query is executed. The subroutine then continues to step 815 where it renames the network-accessible files containing the previous execution results for this report form to be temporary backup files. The subroutine then continues to step 820 where it executes the report form, and upon successful completion of the execution stores the execution results in the network accessible files for this report form. In step 825, the subroutine determines if query execution was successfully completed and the network execution results files were actually generated. If so, the subroutine continues to step 835 and updates information about the most recent execution of this report form. This information can include a timestamp for the most recent execution, as well as the requesting user and the query parameters used. The subroutine then continues to step 840 to copy the network execution results files to the local disk drive of the requesting user. If the subroutine instead determined in step 825 that query execution was not successfully completed and thus that the network execution results files were not actually generated, the subroutine continues to step 830 and renames the temporary backup files to be network execution results files. In this manner, execution results from the last successful query execution will always be available on the network-accessible disk drive. After step 830 or step 840, the subroutine continues to step 845 and returns.

Figure 9:
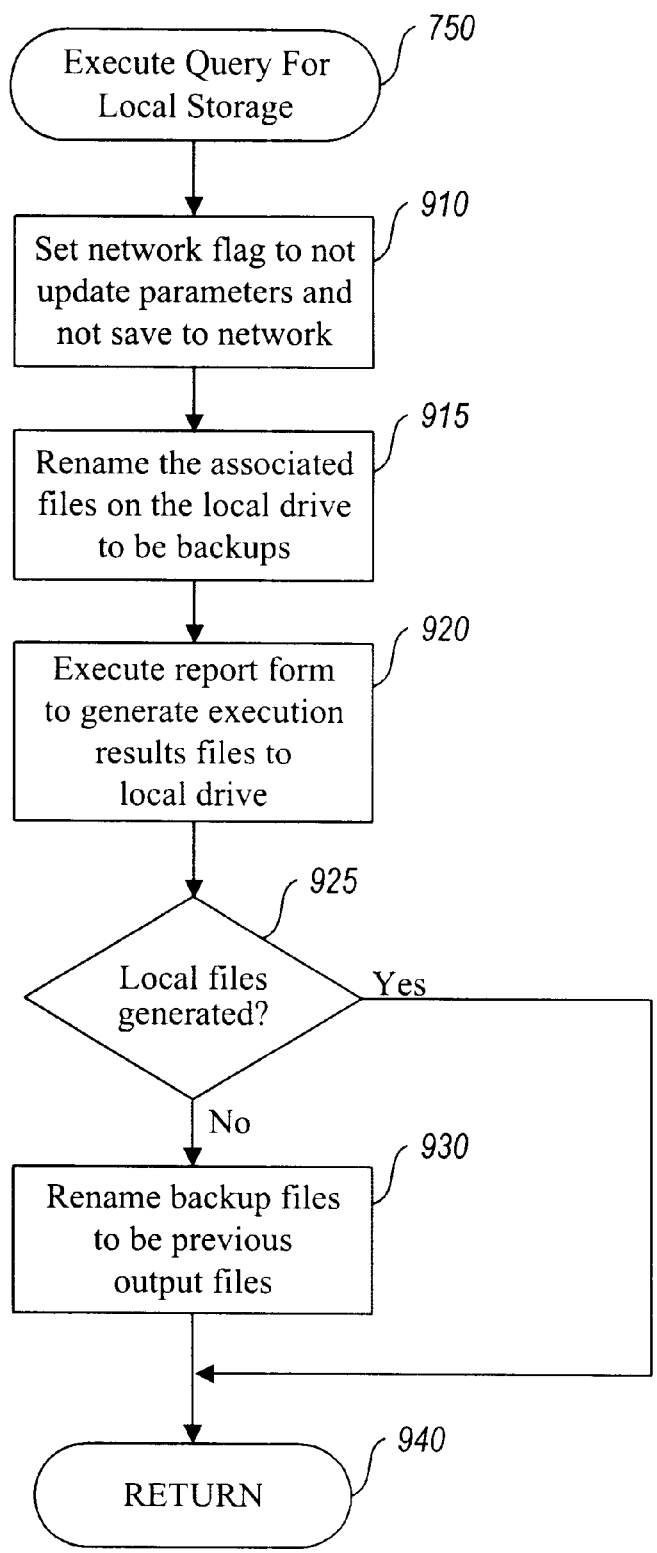
FIG. 9 is a flow diagram of a possible implementation of the Execute Query For Local Storage subroutine.

FIG. 9 is a flow diagram of a possible implementation of the Execute Query For Local Storage subroutine 750. The subroutine executes the report form and stores results of the execution on only the local disk drive of the requesting user. The subroutine begins in step 910 where information is updated so that the database server will not store query execution results to the network-accessible files for this report form. Those skilled in the art will appreciate that this can be performed in a variety of manners, such as setting a global flag or forwarding a message to the database server. The subroutine then continues to step 915 where it renames the files on the requesting user's local disk drive containing the previous execution results for this report form to be temporary backup files. The subroutine then continues to step 920 where it executes the report form, and upon successful completion of the execution stores the execution results in the local files for this report form. In step 925, the subroutine determines if query execution was successfully completed and the local execution results files were actually generated. If not, the subroutine continues to step 930 and renames the temporary backup files to be local execution results files. In this manner, execution results from the last successful query execution for this user and this query will always be available on the local disk drive. After step 930, or if the subroutine instead determined in step 925 that query execution was successfully completed and thus that the local execution results files were actually generated, the subroutine continues to step 940 and returns. In the illustrated embodiment, information such as the last requesting user and the previously used query parameters are not updated because this information refers only to query results available on a network-accessible drive.

Figure 10:
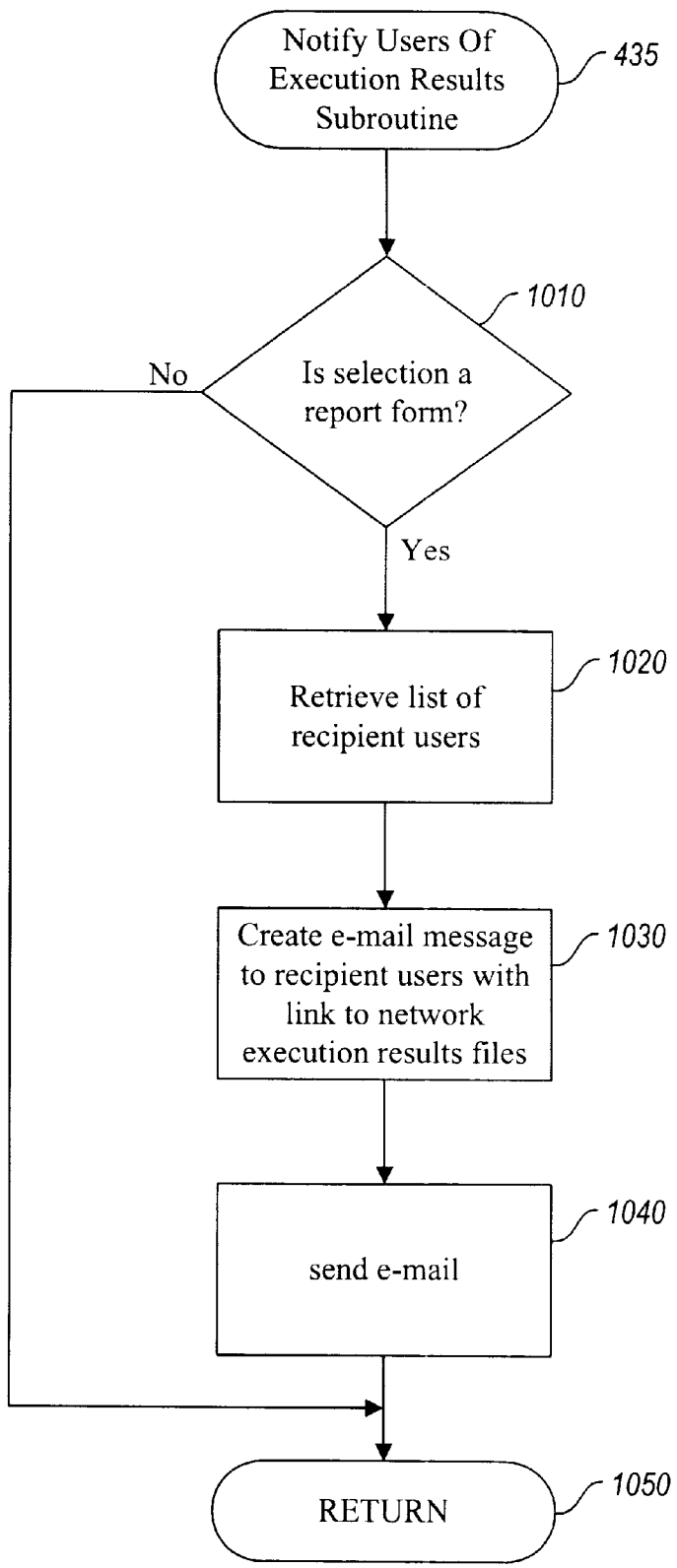
FIG. 10 is a flow diagram of a possible implementation of the Notify Users Of Execution Results subroutine.

FIG. 10 is a possible implementation of the Notify Users Of Execution Results subroutine 435. The subroutine will notify the designated recipient users of the query execution results after execution of the selected query is complete. The subroutine begins at step 1010, where it determines if the selected query is a report form. In the illustrated embodiment, only the requesting user is notified of the results from executing an inquiry, while multiple users may be notified of the results from executing a report form. In addition, those skilled in the art will appreciate that while the illustrated embodiment specifies recipient users as part of the Determine A Query And Query Execution Information subroutine 420, such users could instead be specified after query execution. If it is determined in step 1010 that the selected query is a report form, the subroutine continues to step 1020 to retrieve the list of recipient users that were previously designated to be notified of the results of the report form execution. The subroutine then continues to step 1030 where it creates an email message addressed to the recipient users. The created email message will include a subject and text which indicate the purpose of the message, and will include a link to the network accessible execution results files from the execution of the selected query. The subroutine then continues to step 1040 to send the email to the recipient users. After step 1040, or if it was determined in step 1010 that the selection was not a report form, the subroutine continues to step 1050 where it returns. Those skilled in the art will appreciate that recipient users could be notified of the query execution results in a variety of other ways. For example, the email sent to the users could merely indicate the location of the network execution results files rather than including links to the files. Alternately, the system could page the users, or could add an entry to a scheduling program for each user to remind the users to retrieve the available results files.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for a user of a computer system to supply information to destination users from one of a plurality of databases each storing information, each database having a plurality of associated predefined queries that when executed each retrieve a specified subset of the information stored in the database, the computer-implemented method comprising:

verifying identity of the user;

for each of the plurality of databases,
 after verifying the user identity, retrieving access privileges for the user which identify information stored in the database that the user is authorized to access; and
 retrieving predefined queries associated with the database, the specified subset of each retrieved predefined query including information identified by the retrieved access privileges;

presenting only the retrieved predefined queries to the user that the user is authorized to access based on the user's access privileges and making the other predefined queries associated with the database unavailable to the user based on the user's access privileges;

receiving an indication of a retrieved predefined query selected by the user;

determining the database with which the selected query is associated;

determining whether executing the selected query will impose an excessive load on a database server for the determined database;

when the executing of the selected query will impose an excessive load, delaying the executing of the selected query until the executing will not impose an excessive load; and when the executing of the selected query will not impose an excessive load, retrieving database information by executing the selected query on the database server to retrieve from the determined database the subset of information specified by the selected query; and
 sending to each of the destination users an indication of the retrieved subset of information.

2. The method of claim 1 wherein the selected query is a report form with modifiable options to vary the subset of information to be retrieved, each modifiable option to have an option value when the selected query is executed, and including:

before the determining of whether the executing will impose an excessive load,
  presenting to the user at least one option value for each modifiable option of the selected query, the presented option values such that information has previously been retrieved from the determined database using the selected query with the presented option values for modifiable options;
  receiving an indication from the user of an option value for each modifiable option of the selected query; and
  modifying the selected query to include the indicated option values so that the information to be retrieved by the selected query has been varied.

3. The method of claim 1 including receiving from the user an indication of a scheduled time at which to execute the selected query, and wherein the determining of whether the executing will impose an excessive load is delayed until the indicated scheduled time.

4. The method of claim 1 including:
before the executing of the selected query,
  determining whether the subset of information specified by the selected query was previously retrieved within a specified time period; and
  when the subset was retrieved within the specified time period, supplying database information in lieu of the retrieving of the database information by
  selecting the information previously retrieved within the specified time period; and
  sending to each of the destination users an indication of the selected information.

5. The method of claim 1 including retrieving access information that enables access to the database server for the determined database, and wherein the executing of the selected query uses the retrieved access information.

6. A method for a user of a computer system to retrieve information from one of a plurality of databases using one of a plurality of predefined queries, each query for retrieving specified information from an associated one of the plurality of databases, the method comprising:
  determining access privileges for the user that identify multiple predefined queries, each identified predefined query retrieving information which the user is authorized to access, the identified predefined queries including at least one predefined query associated with each of the plurality of databases;
  after determining access privileges for the user, presenting to the user indications of only those identified predefined queries that the user is authorized to access for each of the plurality of databases and making the other predefined queries associated with each of the plurality of databases unavailable to the user based on the user's access privileges;
  receiving an indication of a selection by the user of an identified predefined query;
  determining whether executing the selected query will impose an excessive load on a database server for the database associated with the selected query;
  when the executing of the selected query will impose an excessive load, delaying the executing of the selected query until the executing will not impose an excessive load; and
  when the executing of the selected query will not impose an excessive load, retrieving access information for accessing the database associated with the selected query; and
  retrieving the specified information for the selected query by using the retrieved access information to access the database associated with the selected query.

7. The method of claim 6 wherein each predefined query has modifiable options to vary the specified information to be retrieved by the query, and including:
  before the retrieving of the specified information for the selected query,
  presenting to the user a value for a modifiable option of the selected query;
  receiving an indication from the user of a value for the modifiable option; and
  modifying the selected query to include the indicated value for the modifiable option.

8. The method of claim 7 wherein when the selected query was most recently used to retrieve information from the associated database, the selected query included the presented value for the modifiable option.

9. The method of claim 6 wherein the retrieved access information includes database access data needed to gain entry to a database server for the database.

10. The method of claim 6 wherein the retrieved access information includes database contact data needed to contact the database.

11. The method of claim 6 including receiving from the user an indication of a scheduled time at which to execute the selected query, and wherein the retrieving of the specified information for the selected query is delayed until the indicated scheduled time.

12. The method of claim 11 wherein the indication of the scheduled time includes an indication to execute the selected query periodically.

13. The method of claim 6 wherein the determining of the access privileges includes retrieving group privileges for the user and retrieving queries associated with the retrieved group privileges.

14. The method of claim 6 wherein the receiving of the indication of the selection by the user of the identified predefined query comprises:
  receiving an indication of a specified query, the specified query suggested by the user and distinct from the identified predefined queries;
  determining whether the specified query retrieves information which the user is authorized to access; and
  when the specified query retrieves information which the user is authorized to access,
  selecting the specified query as an identified predefined query; and
  determining a database associated with the selected query.

15. The method of claim 14 including storing the specified query for future use as a predefined query.

16. A method for a computer system to efficiently retrieve information from a database using one of a plurality of predefined queries, each query for retrieving specified information from the database, the computer-implemented method comprising:
  identifying multiple predefined queries that each retrieve information which the computer system is allowed to access;
  presenting to a user indications of only those identified predefined queries that the user is authorized to access for the database and making the other of the multiple predefined queries associated with the database unavailable to the user based on the user's access privileges;
  receiving an indication of a selection of an identified predefined query;

determining whether retrieving the information specified by the selected query will produce a significant impact on performance of the database;

when the retrieving is determined not to produce a significant impact, retrieving from the database the information specified by the selected query; and when the retrieving is determined to produce a significant impact,
determining whether information approximating the information specified by the selected query was previously retrieved; and
when the approximating information is determined to have been previously retrieved, selecting the approximating information in lieu of retrieving information from the database.

17. The method of claim 16 wherein each query has a specified time period, and wherein the approximating information is selected only when the approximating information was retrieved from the database within the specified time period for the selected query.

18. The method of claim 16 wherein the selected query is a form with a modifiable option to vary the specified information to be retrieved, wherein the selected query has a specified value for the modifiable option, and wherein the determining of whether previously retrieved information approximates the information specified by the selected query involves determining whether the previously retrieved information was retrieved using the selected form with the specified value for the modifiable option.

19. The method of claim 16 including:
receiving an indication of destination users; and
after the retrieving of the specified information from the database, notifying the destination users of the retrieved information.

20. The method of claim 16 including receiving an indication of a scheduled time at which to execute the selected query, and wherein the determining of whether retrieving the information will produce a significant impact is delayed until the indicated scheduled time.

21. The method of claim 16 wherein when the approximating information is determined to have not been recently retrieved, delaying retrieving from the database the information specified by the selected query until a later time.

22. The method of claim 16 wherein when the approximating information is determined to have not been previously retrieved, notifying a user of the computer system that the information specified by the selected query is not currently available.

23. A method for a server to retrieve information from a database using one of a plurality of predefined queries, each query when executed for retrieving specified information from the database, the method comprising:
receiving an indication of a user of a client computer;
verifying identity of the user;
supplying an indication of the verified user identity to a security computer distinct from the client computer in order to retrieve access privileges for the user;
identifying multiple predefined queries which the user is authorized to execute based on the retrieved access privileges;
presenting to the user only the identified predefined queries and making the other predefined queries associated with the database unavailable to the user based on the user's retrieved access privileges;
receiving an indication of a selection by the user of an identified predefined query;
determining whether executing the selected query will impose an excessive load on a database server for the database associated with the selected query;
when the executing of the selected query will impose an excessive load, delaying the executing of the selected query until the executing will not impose an excessive load; and
when the executing of the selected query will not impose an excessive load, executing the selected query to retrieve the specified information for the selected query from the database.

24. The method of claim 23 wherein the receiving of the indication of the selection by the user of the identified predefined query comprises:
receiving an indication of a specified query, the specified query suggested by the user and distinct from the identified predefined queries;
determining whether the specified query retrieves information authorized by the retrieved access privileges; and
when the specified query retrieves information authorized by the retrieved access privileges,
selecting the specified query as an identified predefined query; and
determining a database associated with the selected query.

25. The method of claim 23 wherein each predefined query is associated with a group, and wherein the retrieved access privileges include group privileges for the user.

26. A method for a user to retrieve information from one of a plurality of databases using one of a plurality of predefined report forms, each report form for retrieving a specified type of information from an associated one of the plurality of databases and having options to vary information of the specified type to be retrieved, the computer-implemented method comprising:
identifying types of database information which the user is allowed to access;
identifying a plurality of predefined report forms that each retrieve an identified type of database information;
after determining access privileges for the user, notifying the user of only those identified predefined report forms that the user is authorized to access and making the other predefined report forms associated with the identified type of database information unavailable to the user based on the user's access privileges;
determining whether a selection of an identified predefined report form is made by the user; and
when the user selects an identified predefined report form, retrieving database information by
determining the database associated with the selected report form;
determining the options for the selected report form;
notifying the user of at least one option value choice for each determined option of the selected report form, the option value choices such that information has previously been retrieved from the determined database using the selected report form with the option value choices for the determined options;
receiving an indication from the user of an option value choice for each determined option of the selected report form;
determining whether executing the selected option value choice will impose an excessive load on a database server for the database associated with the selected option value choice;

when the executing of the selected option value choice will impose an excessive load, delaying the executing of the selected option value choice until the executing will not impose an excessive load; and when the executing of the selected option value choice will not impose an excessive load, retrieving from the determined database the information specified by the selected predefined report form with the indicated option value choices for the determined options.

27. The method of claim 26 wherein each user is a member of at least one group, and after the retrieving of the information from the determined database, notifying other members of the at least one group of the retrieved information.

28. The method of claim 26 including:

when the user specifies an inquiry distinct from the identified predefined report forms, the inquiry specifying information from a database, retrieving database information by determining whether the information specified by the inquiry is of at least one of the identified types of database information; and when the information is of at least one of the identified types, retrieving from the database the specified information for the inquiry.

29. A computer-readable medium containing instructions for a method of controlling a computer system to efficiently retrieve information for a user from one of a plurality of databases using one of a plurality of predefined queries, each query for retrieving specified information from an associated one of the plurality of databases, the method comprising:

determining access privileges for the user that identify multiple predefined queries, each identified predefined query retrieving information which the user is authorized to access, the identified predefined queries including at least one predefined query associated with each of the plurality of databases;

after determining access privileges for the user, presenting to the user indications of only those identified predefined queries that the user is authorized to access for each of the plurality of databases and making the other identified predefined queries associated with each of the plurality of databases unavailable to the user based on the user's retrieved access privileges;

receiving an indication of a selection by the user of an identified predefined query;

retrieving access information for accessing the database associated with the selected query;

determining whether executing the selected query will impose an excessive load on a database server for the database associated with the selected query;

when the executing of the selected query will impose an excessive load, delaying the executing of the selected query until the executing will not impose an excessive load; and when the executing of the selected query will not impose an excessive load, retrieving the specified information for the selected query by using the retrieved access information to access the database associated with the selected query.

30. The computer-readable medium of claim 29 wherein each predefined query has modifiable options to vary the specified information to be retrieved by the query, and wherein the computer system is further controlled to:

before the retrieving of the specified information for the selected query, presenting to the user a value for a modifiable option of the selected query;

receiving an indication from the user of a value for the modifiable option; and modifying the selected query to include the indicated value for the modifiable option.

31. The computer-readable medium of claim 29 wherein the retrieved access information includes database access data needed to gain entry to a database server for the database.

32. The computer-readable medium of claim 29 including receiving from the user an indication of a scheduled time at which to execute the selected query, and wherein the retrieving of the specified information for the selected query is delayed until the indicated scheduled time.

33. The computer-readable medium of claim 29 wherein the receiving of the indication of the selection by the user of the identified predefined query comprises:

receiving an indication of a specified query, the specified query suggested by the user and distinct from the identified predefined queries;

determining whether the specified query retrieves information which the user is authorized to access; and when the specified query retrieves information which the user is authorized to access, selecting the specified query as an identified predefined query; and determining a database associated with the selected query.

34. A computer system for efficiently retrieving information from one of a plurality of databases using one of a plurality of predefined queries, each query for retrieving specified information from an associated one of the plurality of databases, comprising:

a query availability monitor that identifies multiple predefined queries, each identified predefined query retrieving information which a user of the computer system is authorized to access, the identified predefined queries including at least one predefined query associated with each of the plurality of databases;

a query selector that receives indications of the identified predefined queries from the query availability monitor, that presents only those indications of the identified predefined queries that the user is authorized to access to the user for each of the plurality of databases and makes the other identified predefined queries associated with each of the plurality of databases unavailable to the user based on the user's retrieved access privileges, and that receives an indication of a selection by the user of an identified predefined query; and a query executor that receives an indication of the selected query from the query selector, that retrieves access information for accessing the database associated with the selected query, and that retrieves the specified information for the selected query by using the retrieved access information to access the database associated with the selected query, wherein before the query executor retrieves the specified information by accessing the database associated with the selected query, the query executor determines whether retrieving the information specified by the selected query will produce a significant impact on performance of the associated database and if so, in lieu of retrieving information from the database selects information approximating the specified information if such approximating information was previously retrieved from the associated database.

35. The computer system of claim 34 including:

a result notifier that receives an indication of the retrieved specified information, that receives an indication of destination users, and that notifies the destination users of the retrieved information after the retrieving of the specified information from the database.

36. The computer system of claim 34 wherein each query has a specified time period, and wherein the approximating information is selected only when the approximating information was retrieved from the associated database within the specified time period for the selected query.

37. The computer system of claim 34 wherein each predefined query has modifiable options to vary the specified information to be retrieved by the query, and wherein the query selector additionally presents to the user a value for a modifiable option of the selected query, receives an indication from the user of a value for the modifiable option, and modifies the selected query to include the indicated value for the modifiable option.

38. The computer system of claim 34 wherein the receiving of the indication of the selection by the user of the identified predefined query includes:

receiving an indication of a specified query, the specified query suggested by the user and distinct from the identified predefined queries;

determining whether the specified query retrieves information which the user is authorized to access; and when the specified query retrieves information which the user is authorized to access, selecting the specified query as an identified predefined query; and determining a database associated with the selected query.

* * * * *